(12) United States Patent
Baril et al.

(10) Patent No.: US 10,071,509 B2
(45) Date of Patent: Sep. 11, 2018

(54) ARRANGEMENT FOR MANUFACTURING A HEAT WINDING CAP

(71) Applicant: ALSTOM Renewable Technologies, Grenoble (FR)

(72) Inventors: Yannick Baril, Québec (CA); José Figueroa, Québec (CA); Michel Sabourin, Québec (CA)

(73) Assignee: GE Renewable Technologies, Grenoble (FR)

( * ) Notice: Subject to any disclaimer, the term of this patent is extended or adjusted under 35 U.S.C. 154(b) by 471 days.

(21) Appl. No.: 14/743,342

(22) Filed: Jun. 18, 2015

(65) Prior Publication Data

US 2015/0375432 A1    Dec. 31, 2015

(30) Foreign Application Priority Data

Jun. 27, 2014  (EP) .................................... 14174783

(51) Int. Cl.
| | |
|---|---|
| *B29C 39/10* | (2006.01) |
| *B29C 39/26* | (2006.01) |
| *H02K 15/12* | (2006.01) |
| *H02K 3/38* | (2006.01) |
| *B29L 31/34* | (2006.01) |

(52) U.S. Cl.
CPC .............. *B29C 39/10* (2013.01); *B29C 39/26* (2013.01); *H02K 3/38* (2013.01); *H02K 15/12* (2013.01); *B29L 2031/3481* (2013.01)

(58) Field of Classification Search
CPC .......... B29C 39/10; B29C 39/26; H02K 15/12
See application file for complete search history.

(56) References Cited

U.S. PATENT DOCUMENTS

| | | | |
|---|---|---|---|
| 4,151,434 A | 4/1979 | Zona et al. | |
| 4,309,636 A * | 1/1982 | Pollok ..................... | H02K 3/38 264/272.11 |
| 4,621,212 A | 11/1986 | Torossian et al. | |
| 4,803,028 A | 2/1989 | Torossian et al. | |
| 5,142,182 A * | 8/1992 | Grant ...................... | H02K 3/38 310/260 |
| 5,316,801 A | 5/1994 | Hopeck | |

FOREIGN PATENT DOCUMENTS

FR       1 489 751 A    7/1967

* cited by examiner

*Primary Examiner* — Robert B Davis
(74) *Attorney, Agent, or Firm* — Dority & Manning, P.A.

(57) ABSTRACT

The present disclosure relates to an arrangement for manufacturing a head winding cap of an electric machine, comprising a container for accommodating a molding compound, the container is attachable to two winding arms adjacent to a clip connecting the winding arms and enclosing the winding arms, the container projecting perpendicular to the winding arms when attached, and the container creating a tight inclusion for the molding compound, whereas the cap is filled with a dielectric compound.

5 Claims, 6 Drawing Sheets

ARRANGEMENT FOR MANUFACTURING A HEAT WINDING CAP

CROSS-REFERENCE TO RELATED APPLICATIONS

This application claims priority to European application 14174783.2 filed Jun. 27, 2014, the contents of which are hereby incorporated in its entirety.

TECHNOLOGY FIELD

The present disclosure relates to an arrangement for manufacturing a head winding cap, a method for manufacturing a head winding cap, and the use of an arrangement for manufacturing a head winding cap for an electric machine.

BACKGROUND

The electric machine is in particular a rotating electric machine such as a synchronous generator to be connected to a gas or steam turbine (turbogenerator) or a synchronous generator to be connected to a hydro turbine (hydro generator) or an asynchronous generator or a synchronous or asynchronous electric motor or also other types of electric machines.

The conductive windings or conductors of coils to be placed into notches of a stator or rotor in electric machines are sometimes provided with caps at the endings of the windings. These caps are made of glass fiber or other suitable non-conducting materials. The caps are attached to the end windings by means of different fixation methods. In some applications, especially in North America, the caps are held to the winding by a dielectric filler resin, in other applications, especially in Europe, there are additional clips provided for fixation. The manufacturing process is however complicated as in the technical field of vertical generators the provision of a cap at the driving end below the generator head winding is simple because the cap opening is facing up and the cap acts like a bowl. However, the provision of the upper cap is complicated because an opening to be filled with liquid filling mass to produce the cap is facing down. This means for a low viscosity filling mass the mass tends to flow down and away from the cap to be fabricated severely damaging the winding. This results in an unusable machine leading to time, production and labour loss. Therefore, commonly, filling mass or compound with a high viscosity, e.g. Trixotropic, is used in the state of the art. Often, pastes are used to this end. These filling compounds of high viscosity used in the state of the art however are difficult to manipulate, labour intensive and produce much waste material.

FR1489751 describes caps for electric machines made from fabrics of glass fibers impregnated with a resin. A resin poured into the caps is an epoxy resin adhesive from the curing type at high or low temperatures. The resin covers the end caps for insulating the coils. Means are provided to ensure the sealing between the edges of the caps and the ends of the coils. The caps are held in place by wedges inserted between them.

U.S. Pat. No. 4,151,434 describes encapsulation of the terminal portion of a winding end turn conductor, which projects from the core member of a dynamoelectric machine, in an epoxy potting compound by means of a casting assembly which comprises a detachable conformable pad, a plastic sleeve mold, and a portable vise. The conformable pad is fitted about the terminal portion of the conductor to provide a temporary barrier to axial flow of the epoxy compound during casting. The plastic sleeve is disposed around the terminal portion in a spaced relationship therewith and in an abutting relation with the pad to provide a barrier to the radial flow of the epoxy compound during casting. Clamping means such as a portable vise is fitted about the conformable pad and is tightened to establish a compressive union at the interface of the conformable pad and the terminal portion of the conductor to prevent leakage.

U.S. Pat. No. 4,621,212 describes series loops of the stator of a large steam turbine-generator electrically insulated from each other by enclosing each of them in its own clamshell thermoplastic resin mold and filling the mold with an electrically-insulating thermosetting resin material which bonds to the metal of the series loops and the stator bars and bonds also to the ground insulation covering on the stator bars and to the mold and together with the mold provides in cured form an integral body which is resistant to vibrational and impact forces and to distortional forces incident to thermal cycling of the equipment in normal use.

U.S. Pat. No. 5,316,801 describes an epoxy powder electrostatically charged and spray-coated onto the series loop connections of a dynamoelectric machine. With the series loop connections grounded, the electrostatically charged particles adhere to the connections and wrap about the front, back and sides of the connections to provide a substantially uniform thickness or build-up of the electrically insulating epoxy powder. With the series loop connections preheated, the epoxy will begin to melt and flow, further ensuring a uniform build-up and thickness about the connections. The spray-coating is then heat-cured, thereby affording electrically insulated series loop connections at the opposite ends of the dynamoelectric machine.

None of the documents above provides an easy to handle manufacturing process to build an end winding cap meeting the dielectric requirements. Furthermore, the end winding caps of the state of the art do not possess the wished properties with regard to quality demands.

SUMMARY

An object of the invention is to provide an arrangement and a method to facilitate the filling of a head winding cap with liquid resin for a winding in an electric machine and to provide a neat head winding cap meeting the dielectric requirements.

The object is solved by the features of the independent claims. Further examples of the invention are disclosed in the dependent claims.

BRIEF DESCRIPTION OF THE DRAWINGS

Further characteristics and advantages will be more apparent from the description of a preferred but non-exclusive embodiment of the arrangement, illustrated by way of non-limiting example in the accompanying drawings, in which.

With reference to the figures, these show an arrangement and a method according to an example of the invention, wherein like reference numerals designate identical or corresponding parts throughout the several views.

DETAILED DESCRIPTION OF THE DRAWINGS

Figure 1:
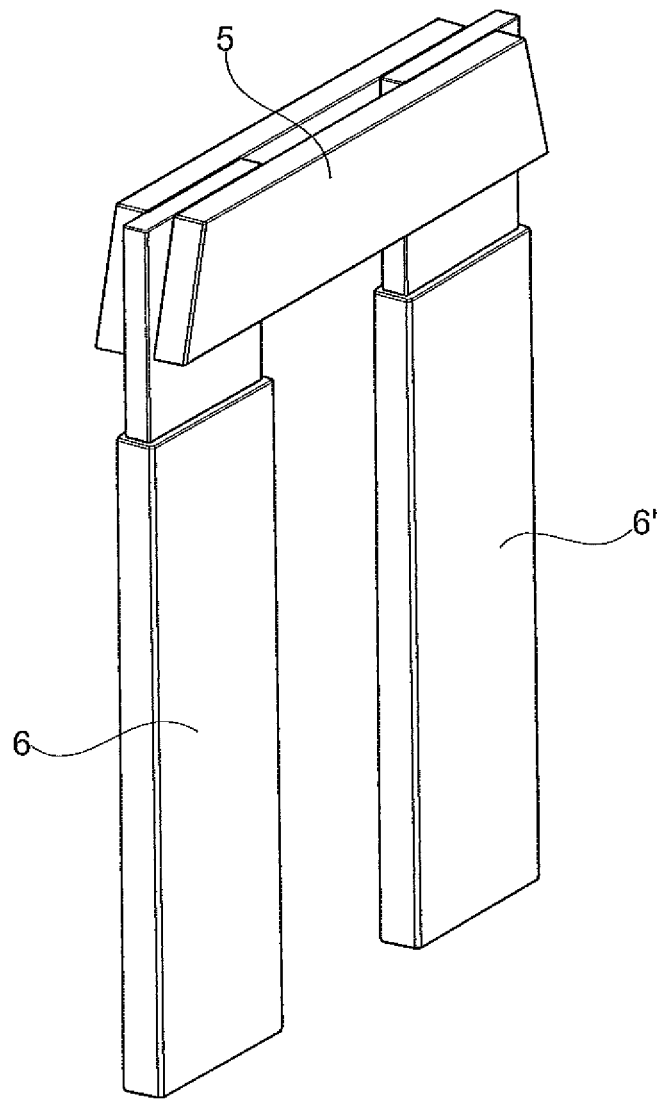
FIG. 1 shows a schematic side view of a head winding before manufacturing a head winding cap with two arms of a winding connected by a head winding.

FIG. 1 shows a schematic side view of a head winding interconnection. The head winding interconnection is made from three parts, namely a clip 5 above and two arms 6, 6' or bars at each side. The two arms 6, 6' are separated first, in manufacturing process put into a stator core and then welded together using an additional copper piece (not shown). This configuration is commonly found manufactured to be assembled into an electric machine, especially a generator for generating high power. The clip 5 is hereby defined as the part shown projecting in the horizontal direction. The head windings arms 6, 6' project in the vertical in this view and being connected to the clip 5 forming a 'u'. In the assembled state the head winding arms 6, 6' are directed also diagonal. The clip 5 and the head windings arms 6, 6' of the winding are all parts of the winding of a coil as part of the electromagnetic configuration of a stator or rotor. In this perspective the u-shape of the clip 5 with the arms 6, 6' is shown upside down which is the orientation of the configuration to be handled within this context. FIG. 1 shows the configuration of the clip 5 and the arms 6, 6' before the attachment of a cap 2 to the clip 5.

Figure 2:
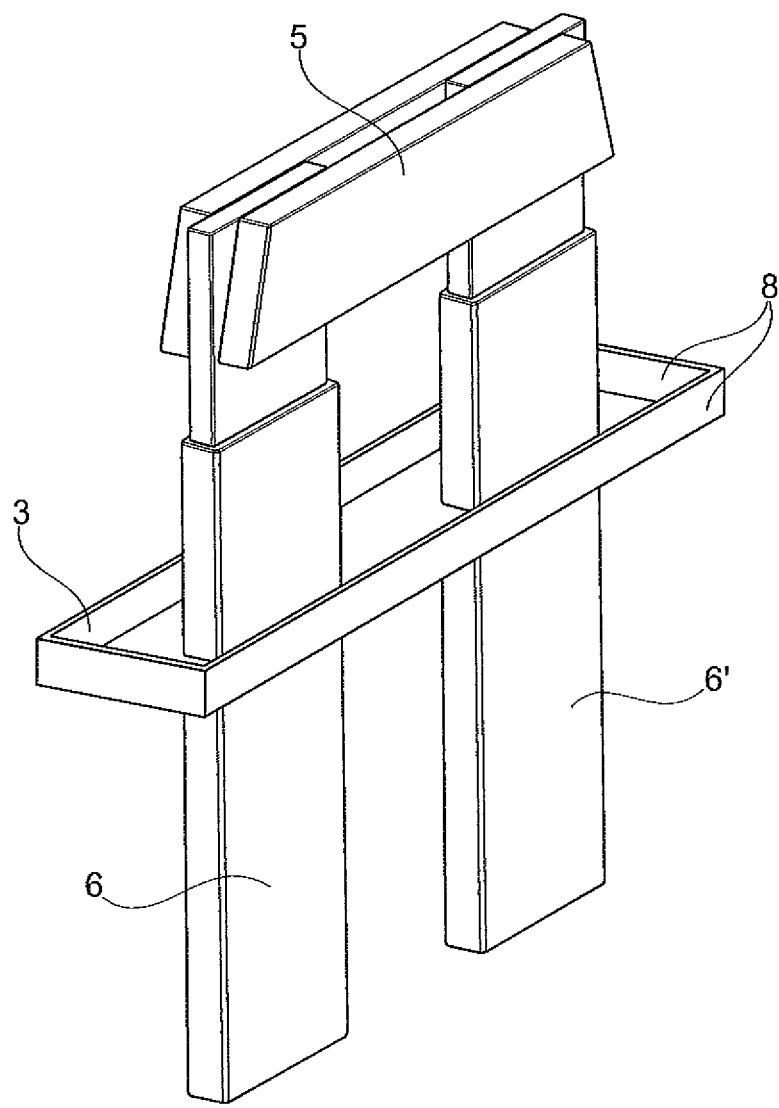
FIG. 2 shows a schematic side view of a head winding similar to FIG. 1 with a container applied to the two arms of the winding and the container being open in the direction above.

FIG. 2 shows a schematic side view of a clip 5 similar to FIG. 1 with a container 3 applied to the two head windings arms 6, 6' of the winding. The container 3 comprises a rectangular tank created by a bottom and walls 8 at each side of the rectangular container 3 in this example. The walls 8 project in the direction above in this perspective. The container 3 can be made from a metal, plastic, glass fiber or any other suitable material. In an example the container 3 consists of two symmetric parts to be easily assembled to the arms 6, 6' from both sides of the arms 6, 6'. The two parts of the container 3 can be connected together with bar clamps, wires, wrapping or other suitable mean for example. In the configuration shown the container 3 encompasses the arms 6, 6' of the winding to create a tight tank by means of putting a sealing mastic put in all junctions between the container 3 and the arms 6, 6' for gathering a moulding compound 12. The sealing mastic is for example a modelling paste, silicone or a clay or other suitable material.

Figure 3:
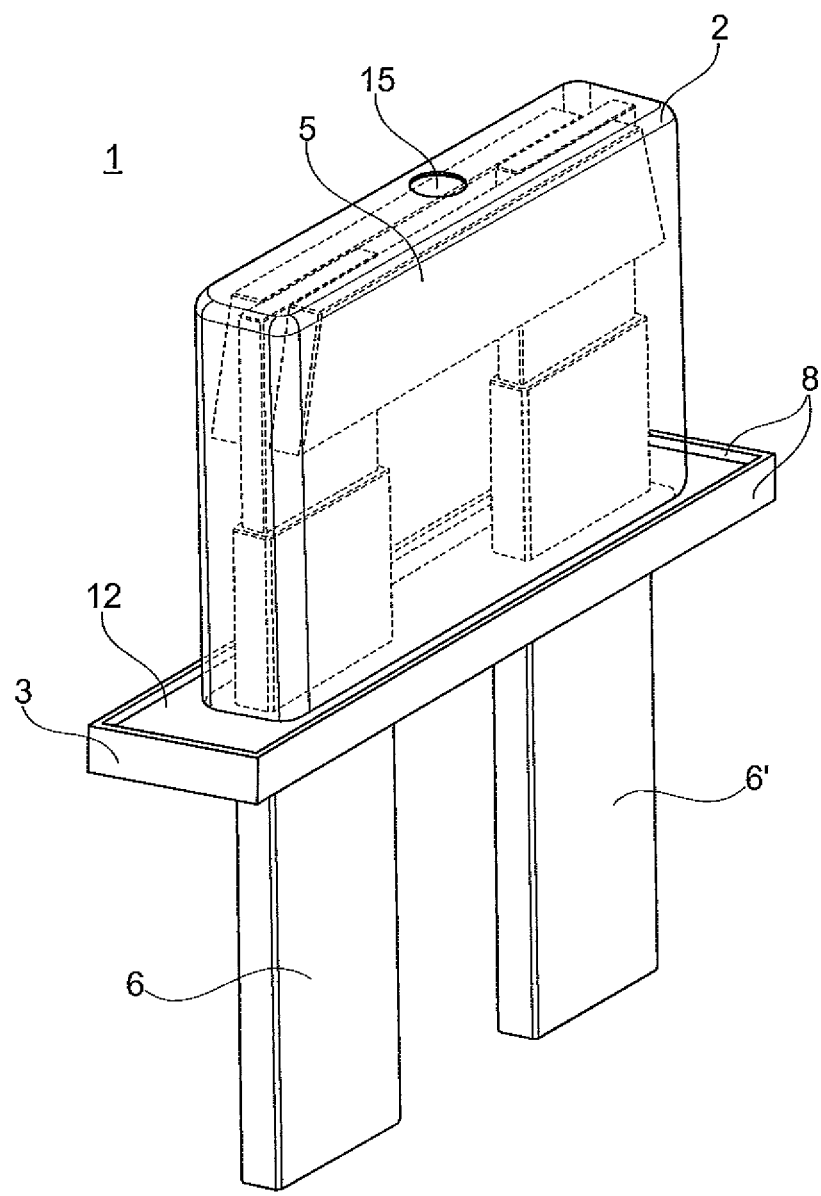
FIG. 3 shows a schematic side view similar to FIG. 2 with the head winding covered with a cap with a hole on top and the container partly filled with the moulding compound.

FIG. 3 shows a schematic side view similar to FIG. 2 with the tightly attached container 3. The container 3 is partly filled with the moulding compound 12. The filling of the container 3 can be done easily from one of the sides of the container 3. The head winding cap 2 is at the below side confined by the moulding compound 12 in container 3 creating a tight connection to the arms 6, 6' through which no dielectric compound 13 can pass as described below. A cap 2 is positioned over the clip 5 covering the clip 5 and parts of the head winding arms 6, 6'. The term arrangement 1 in the context of this disclosure defines the container 3 and the cap 2 furnished with a hole 15. As described below the cap 2 forms part of the head winding in the later steps as the cap 2 is cast to the head winding 5. The lower end of the cap 2 stands on the bottom of the container 3 in contact with the moulding compound 12. When the moulding compound 12 cures it seals the lower cap end. The cap 2 is made from a fiber glass or other suitable material in this example and shown transparent here for sake of understanding. The cap 2 is provided with the hole 15 projecting through the whole thickness of the cap 2 thereby connecting the outside with the inside defined by the cap 2. The hole 15 is provided at the top of the cap 2 in this example, further positions of the hole 15 can be realized. During filling of the container 3 with the moulding compound 12 the hole 15 can be closed in an example of the invention. Alternatively the hole 15 is open during the filling step of the container 3. At this stage a certain time passes to cure and harden the moulding compound 12 depending on the material properties used as moulding compound 12. Only when the moulding compound 12 is cured the next method step is to be executed, as described below.

Figure 4:
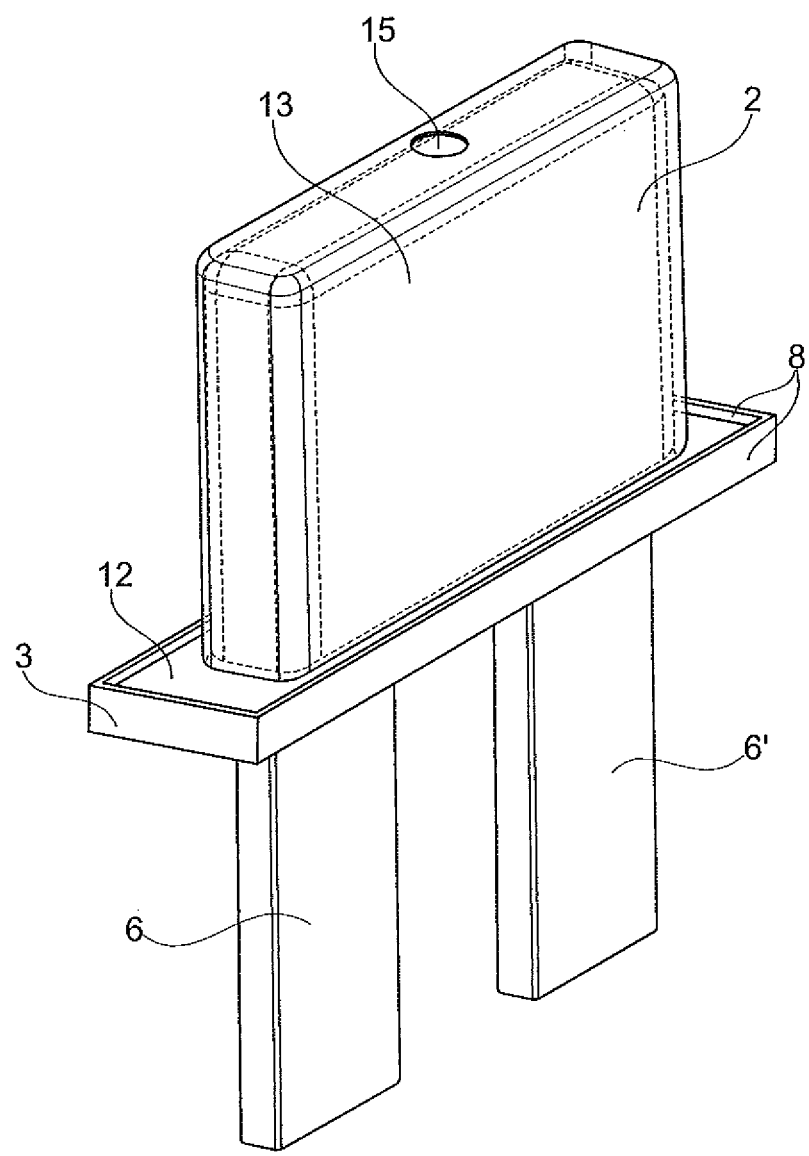
FIG. 4 shows a schematic side view similar to FIG. 3 with a moulding compound filled in through the hole at the top of the cap; winding to be filled with the moulding compound.

Next, a dielectric compound 13 is inserted through the hole 15 inside the space defined by the cap 2 and closed below by the bottom of the container 3 sealed by the cured moulding compound 12. The dielectric compound 13 can comprise a variety of materials, also materials with a low viscosity in the contrary to the state of the art. The dielectric compound 13 can be chosen from different epoxy types, silicones, urethanes or other suitable dielectric materials. The dielectric compound 13 has a good thermal conductivity, a very high insulation resistance, and has a good adhesion to the copper of the arms 6, 6', to the clip 5 and to the insulation material of the cap 2. By virtue of using a low viscous dielectric compound 13 the system reduces intervention time compared to using a conventional filling compound with lower viscosity having to be spooned and finished. The described method reduces material management costs as only one type of dielectric compound is applicable for filling the lower and upper caps 2 in the generator, whereas here the upper cap 2 is described. Further, the use of low viscosity filling compound reduces the amount of air bubbles in the finished product. Thus, as a result of this, potential problems like partial discharge in operation of the windings supplied with the cap 2 are reduced. Dielectric compounds 13 with a viscosity in the range of approximately 3000 cps to 20000 cps at 20° C. can be chosen. Here, the dielectric compound 13 flowing down due to high viscosity is stopped by the cured moulding compound 12 in the container 3 of the arrangement 1. The arrangement 1 thereby eliminates the risk of the dielectric compound leakage which might lead to pollution of the generator in which the windings are assembled. The arrangement 1 furthermore eliminates unnecessary cleaning from leaked material, i.e. dielectric compound 13. The filling of the cap 2 can be done with application of high pressure until the whole space defined by the cap 2 and the bottom of the container 3 is filled with dielectric compound 13. Dielectric compound 13 with low viscosity allows the use of a pumping station to pump in the dielectric compound 13 through the hole 15. This measure increases the filling speed and improves the repeatability and productivity of the method. Another advantage of filling the dielectric compound 13 by a pumping station is the reduction of waste material near to zero. The filling method through the hole 15 in the cap 2 does also produce no bubbles in the dielectric compound 13 which impair the properties of the end product. Further, the disclosed filling method has a resistance to thermal cycling compared to other methods. After the step of filling, the dielectric compound 13 is cured and hardened leading to the configuration shown in FIGS. 4 and 5. For sake of understanding the filling of the cap 2 is shown as a dark area, whereas the cap 2 is shown transparent. In fact it is clear that the cap 2 is not transparent. This step of curing can be supported by application of heat or electromagnetic radiation to the cap 2. FIG. 4 accordingly shows a schematic side view similar to FIG. 3 with the dielectric compound 13 cured. The head winding 5 and the cap 2 are now connected by the dielectric compound 12 creating a one-part configuration, referred to as head winding cap 2. The head winding cap 2 has the outer contours of the cap 2 and is completely filled with the cured mass encompassing the clip 5 and the upper parts of the head windings arms 6, 6' as is shown in FIG. 4.

Figure 5:
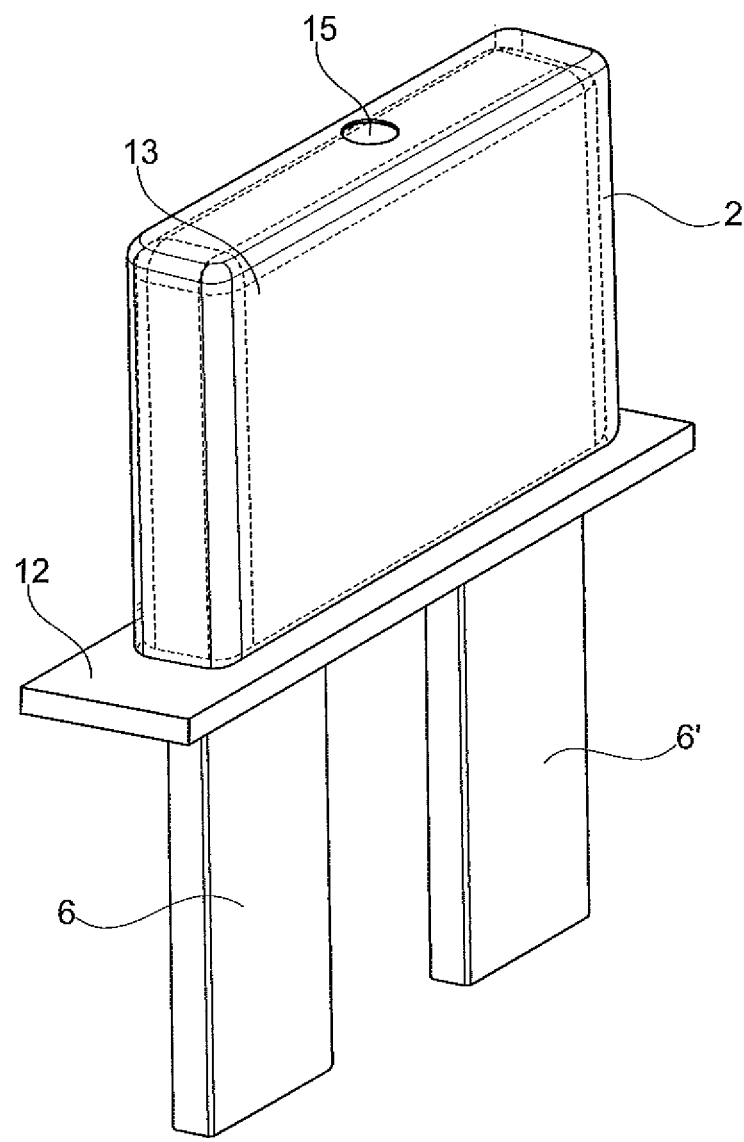
FIG. 5 shows a schematic side view similar to FIG. 4 with a completed and fixed head winding cap, the container being removed, and the moulding compound essentially being cured.

FIG. 5 shows a schematic side view similar to FIG. 4 with a completed head winding cap 2 fixed to the clip 5. Here, the container 3 is removed after the dielectric compound 13 has been fully cured from the configuration together with the cured moulding compound 12. By virtue of using alginate or a suitable silicone for moulding compound 12 it can be easily removed leaving no residue. In the example of a two-part container 3 the container 3 can be disconnected at the interfaces simply by removing bar clamps or similar measures. A certain manual force has to be applied to the parts of the container 3 to disconnect from the cured material. The dielectric compound 13 requires no manual finishing after removing the moulding compound 12. Rather, the method described assures smooth surfaces of the finished head winding cap 2. For the method described there is no application of chemicals required.

Figure 6:
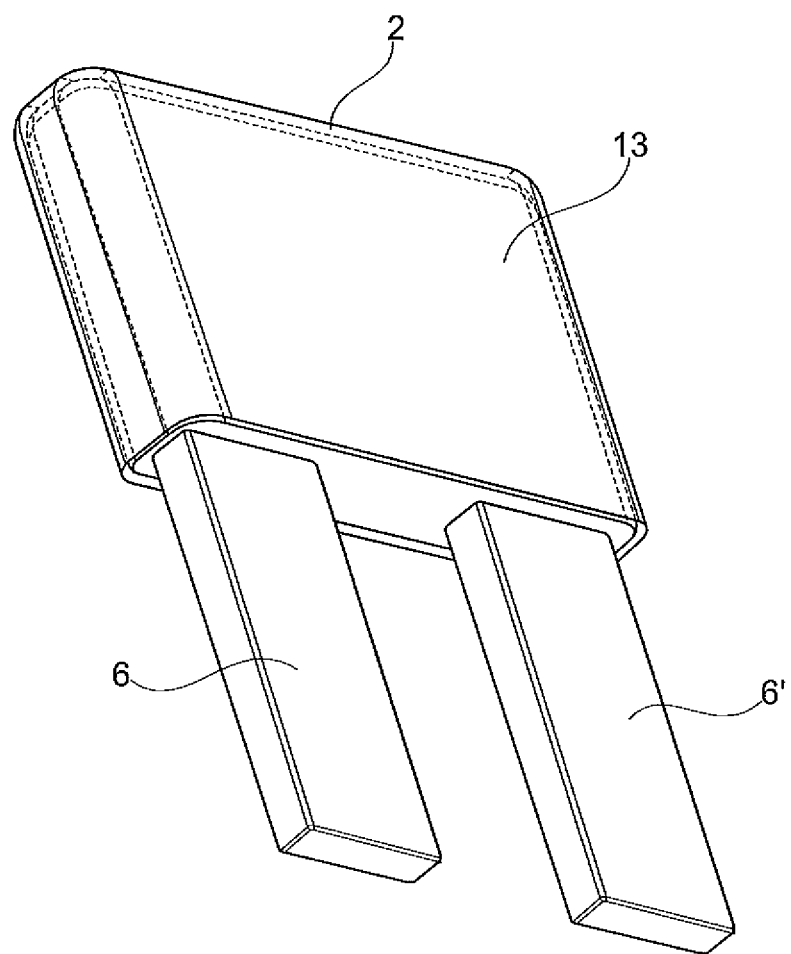
FIG. 6 shows a perspective view from below similar to FIG. 5 of the finished head winding cap with the excessive moulding compound around the arms of the winding removed.

FIG. 6 shows a perspective view of the head winding cap 2 with arms 6, 6' of the windings from below similar to FIG. 5. The excessive moulding compound 12 around the arms 6, 6' of the winding is removed here. Shown is the finished head winding cap 2 with the cap 2 and integrated clip 5 with arms 6, 6' of the winding projecting from the head winding cap 2. The part fabricated as described provides a more esthetic appearance as the contours are smooth and leakage of the dielectric compound 13 during manufacturing is essentially avoided. Notably the bottom side of the winding head cap 2 has a perfectly flat surface. As a result of the method and of the application of the arrangement 1 there are no leavings of dielectric compound 13 neither at the arms 6, 6' nor at the cap 2. The areas of passage from the arms 6, 6' to the flat bottom side of the head winding cap 2 are neat, i.e. there is an angle of 90 degree between the bottom side and the arms 6, 6' established with a very low deviation. The areas of passage from the arms 6, 6' to the flat bottom side of the head winding cap 2 have also no rests of dielectric compound 13 which is merely included within the boundaries of the cap 2.

While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

The invention claimed is:

1. An arrangement for manufacturing a head winding cap of an electric machine having two spaced-apart winding arms and a clip connecting the winding arms together, the arrangement comprising a container that accommodates a moulding compound therein, the container configured for attachment to the two winding arms adjacent to the clip and encloses the winding arms, the container defining a cavity surrounded by side walls, the cavity containing the moulding compound and projecting perpendicular to the winding arms when attached, the arrangement further comprising a cap mold that fits over the clip and the winding arms, the cap mold having a bottom that extends into the moulding compound in the cavity, the side walls of the cavity defining a perimeter wall that surrounds the bottom of the cap mold, and the cavity creating a tight inclusion for the moulding compound, whereas the cap mold is filled with a dielectric compound.

2. The arrangement according to claim 1, wherein the container is designed from two parts to be connectable when attached to the winding arms.

3. The arrangement according to claim 1, wherein the container has a rectangular geometry.

4. The arrangement according to claim 1, further comprising a removable silicon, a modelling clay, or a foam at the intersection of the winding arms and the container to support the tightness of the container.

5. The arrangement according to claim 1, further comprising wires or a wrapping for securing the container that contains the moulding compound to the clip.

* * * * *